United States Patent [19]

Wald et al.

[11] Patent Number: 5,011,512
[45] Date of Patent: Apr. 30, 1991

[54] COATED ABRASIVE PRODUCTS EMPLOYING NONABRASIVE DILUENT GRAINS

[75] Inventors: Vernon M. Wald; Richard A. Masson; Fredrick D. Brown; David E. Broberg, all of St. Paul, Minn.

[73] Assignee: Minnesota Mining and Manufacturing Company, St. Paul, Minn.

[21] Appl. No.: 470,429

[22] Filed: Jan. 25, 1990

Related U.S. Application Data

[63] Continuation of Ser. No. 216,799, Jul. 8, 1988, abandoned.

[51] Int. Cl.$^5$ .............................................. B24B 1/00
[52] U.S. Cl. ...................................... 51/295; 51/293; 51/298; 51/307; 51/309
[58] Field of Search ................. 51/293, 295, 298, 307, 51/309

[56] References Cited

U.S. PATENT DOCUMENTS

| | | | |
|---|---|---|---|
| 1,830,757 | 11/1931 | Hartmann | 51/188 |
| 2,410,506 | 11/1946 | Kirchner et al. | 51/188 |
| 3,175,894 | 3/1965 | Foot | 51/298 |
| 3,266,878 | 8/1966 | Timmer et al. | 51/298 |
| 3,476,537 | 11/1969 | Markotan | 51/296 |
| 3,996,702 | 12/1976 | Leahy | 51/295 |
| 4,734,104 | 3/1988 | Broberg | 51/295 |
| 4,737,163 | 4/1988 | Larkey | 51/295 |
| 4,762,533 | 8/1988 | Oide | 51/298 |

FOREIGN PATENT DOCUMENTS

| | | | |
|---|---|---|---|
| 802150 | 2/1963 | Canada | 117/37 |
| 228856 | 7/1987 | European Pat. Off. | |

*Primary Examiner*—William R. Dixon, Jr.
*Assistant Examiner*—Willie J. Thompson
*Attorney, Agent, or Firm*—Donald M. Sell; Walter N. Kirn; Richard Francis

[57] ABSTRACT

A coated abrasive article comprised of a blend of premium abrasive grains and nonabrasive diluent grains adhered to a backing material by a resinous binder. The article has an unexpected abrading efficiency, performing equal to, or superior to, a coated abrasive article containing only premium abrasive grains.

20 Claims, No Drawings

COATED ABRASIVE PRODUCTS EMPLOYING NONABRASIVE DILUENT GRAINS

This is a continuation of application Ser. No. 216,799, filed Jul. 8, 1988, now abandoned.

TECHNICAL FIELD

The present invention relates to coated abrasive products which contain both abrasive grains and nonabrasive diluent grains and to a method of making the same.

BACKGROUND ART

Coated abrasives typically consist of a backing substrate, abrasive grains, and a bonding system which operates to hold the abrasive grains to the backing. In a typical coated abrasive product, the backing is first coated with a layer of adhesive, commonly referred to as a "make coat", and then the abrasive grains are applied. The resulting adhesive/abrasive composite layer is then generally solidified or set enough to retain the abrasive grains to the backing, so that a second layer of adhesive, commonly referred to as a "size coat", can be applied. The size coat further reinforces the coated abrasive product upon setting. Optionally, a "supersize coat", which may contain grinding aids, can be applied over the solidified size coat. Once the size coat and supesize coat, if used, has cured, the resulting coated abrasive product can be formed into a variety of convenient articles such as sheets, rolls, belts and discs.

The backing substrate used in coated abrasive products is typically chosen from paper, polymeric film, cloth, vulcanized fiber, nonwoven web, combinations thereof, or treated versions of these. Commonly used abrasive grains include flint, garnet, emery, silicon carbide, fused aluminum oxide, ceramic aluminum oxide, fused alumina-zirconia, fused zirconia, diamonds, multigrain granules. Conventional bond systems typically comprise a glutinous or resinous adhesive such as hide glue, phenolic, epoxy, acrylate, melamine, urethane, ureaformaldehyde or mixtures thereof. Fillers are sometimes added to the adhesive to reduce the cost and to improve the cured resin's heat stability and hardness.

For many years fused aluminum oxide and silicon carbide were the primary abrasive grains used in coated abrasives. This has been changed somewhat by the development of "premium" abrasive grains such as fused alumina-zirconia (commercially available from the Norton Company of Worcester, Mass. under the trade designation NorZon) and alpha alumina-based ceramic materials (commercially available from the 3M Company of St. Paul, Minn. under the trade designation Cubitron ®). Coated abrasive products containing these premium abrasive grains generally perform better in stock removal applications than coated abrasive products containing fused aluminum oxide or silicon carbide. Fused alumina-zirconia and alpha alumina-based ceramic materials are not universally used in coated abrasives, however, due to their high cost in comparison to fused aluminum oxide and silicon carbide. Thus, an incentive exists to reduce the cost of coated abrasive products containing these premium abrasives without sacrificing their performance.

The present invention achieves this goal by using premium abrasive grains in combination with nonabrasive inorganic diluent grains whose Knoop hardness is less than 200. The addition of the diluent grain provides a coated abrasive product of lower cost having equal or improved performance when compared to a coated abrasive product comprised only of the premium abrasive grains.

The blending of two or more types of grains to reduce the cost and/or to improve the performance of an abrasive article is well known in the art. Examples disclosing such blending include:

U.S. Pat. No. 2,410,506, Kirchner et al, which discloses a coated abrasive article wherein an expensive diamond abrasive grit is diluted with relatively inexpensive silicon carbide abrasive grits.

Assignee's European patent application, EP 228,856 published Jul. 15, 1987, which discloses blending abrasive grits formed of ceramic-containing oxides of aluminum and and yttrium with less expensive conventional abrasive grits or materials which are not noted as abrasive, such as marble, glass and the like, in an abrasive product to reduce cost.

U.S. Pat. No. 3,175,894, Foot, which discloses a bonded abrasive article comprised of an admixture of fused alumina abrasive particles and fused zirconia abrasive particles. The combination of the two grains is reported to produce an abrasive article having performance characteristics superior to articles made of either fused alumina or fused zirconia alone. Additionally, diluting the expensive fused zirconia with less expensive fused alumina abrasive grains lowers the cost of the abrasive article.

U.S. Pat. No. 1,830,757, Hartmann, which discloses abrasive articles, both bonded and coated, comprised of a mixture of abrasive particles having a Moh's hardness of 9 or greater and friable nonabrasive particles having a Moh's hardness below 9. The nonabrasive particles reportedly may be any particles of a granular nature that are more friable than the abrasive grains and yet firm enough to break out of the bonded mass without glazing the surface of the article, or that do not form as firm a union with the bond adhesive as do the abrasive particles. During grinding, the friable grains are said to break apart and leave holes or depressions over the grinding face which results in an open, sharp-cutting surface that improves the abrasive action.

U.S. Pat. No. 3,476,537, Markotan, which discloses abrasive articles, both bonded and coated, in which porosity has been induced by the addition, to the abrasive composition, of a granular agent approximating the abrasive grains in size but softer than the abrasive grains. The porosity inducing agent is preferably one that is widely available at very low cost, as compared with that of the abrasive grit material. The porosity inducing agent reportedly may be selected from limestone, natural or activated bauxite, and minerals such as olivine, gypsum, chromite, coquimbite, pyrolusite, molybdenite, galena, halite and the like, as well as a variety of products manufactured for a similar purpose. It is noted that the materials referred to above vary quite widely in hardness on the Moh and Knoop scales, i.e., from Moh's Nos. 1-3 to as high as 6 or 7. These improved abrasive products reportedly will remove more stock than, or at least as much as, a conventional product.

U.S. Pat. No. 3,996,702, Leahy, which discloses a coated abrasive product using fused zirconia as the abrasive. It is considered desirable, however, to include a substantial portion of alumina abrasive grains or other diluent to reduce the cost of the product without unduly reducing performance. The alumina grains can either be blended with zirconia grains or, fused alumina-zirconia grains may be formed by crushing hardened fused blends of alumina and zirconia. If desired, softer grains such as flint, which function in a manner analogous to a filler or diluent, reportedly may be blended with fused zirconia containing grains.

U.S. Pat. No. 3,266,878, Timmer et al., which discloses a coated abrasive product wherein diamond abrasive is diluted with an abrasive material capable of being formed into discrete particles and having a Moh's hardness within the range from 4.0 to 8.5. The dilution of the diamond abrasive reportedly increases the cut of the abrasive surface and reduces the cost of the abrasive article.

Canadian Patent No. 802,150, published Feb. 11, 1964, Cadwell, which discloses a coated abrasive product comprising diamond abrasive granules diluted with granules having a Knoop hardness in the range from 200 to 650. Examples of this invention reportedly removed three times more stock per carat of diamond consumed than conventional diamond articles such as described in Kirchner et al. discussed above.

U.S. Pat. No. 4,734,104, Broberg, and U.S. Pat. No. 4,737,163, Larkey, which disclose coated abrasive products wherein the abrasive grains comprise a mixture of expensive "superior" abrasive grains, such as co-fused alumina-zirconia, and alpha alumina-based ceramic grains, with other abrasive grains such as fused alumina. The superior abrasive grains were concentrated in the coarse fraction of the abrasive grain grading sequence while the other abrasive grains were concentrated in the fine fraction. Reportedly, the addition of the superior abrasive grains improved abrading performance significantly more than would be expected, with products containing the blend of grains performing superiorly, in some cases, to products made with either abrasive grain alone.

It should be clear at this point that Applicant does not content that he has been the first to incorporate non-abrasive inorganic diluent grains having a Knoop hardness less than 200 into an abrasive article. Markotan discloses abrasive articles wherein known abrasives are diluted with granular materials such as limestone and gypsum. Rather, the invention is primarily concerned with the unexpected discovery that blending premium abrasive grains with nonabrasive inorganic diluent grains having a Knoop hardness less than 200, in a coated abrasive product, not only lowers the cost of the article, but does so without reducing the article's performance.

The benefit of a reduced article cost without a corresponding reduction in performance for coated abrasive products containing nonabrasive inorganic diluents selected from the class having a Knoop hardness less than 200 is unexpected in view of the state of the art. The prior art appears to limit the class of diluents capable of providing this benefit in coated abrasive articles to diluents having greater hardness. For example, Cadwell limits the diluents to those having a Knoop hardness in the range from 200 to 650 and Timmer et al. limit the diluents to those having a Moh's hardness from 4.0 to 8.5. Thus, the art teaches away from the use of diluents having a Knoop hardness less than 200 to achieve this benefit in coated abrasives.

Additionally, although coated abrasive products containing diluents within this class are included within the disclosures of Hartmann and Markotan, these two patents deal primarily with bonded abrasive products. In fact, all of the examples disclosed in these two patents showing improved or equal performance by abrasive products containing these diluents used bonded abrasive wheels. However, due to the difference in mode of operation between bonded and coated abrasives, improved or equal performance in coated abrasive articles would not be expected to follow directly from the improved performance attributable to the incorporation of these diluents in bonded abrasives. Bonded abrasives rely upon the continual breakdown and removal of the abrasive grains on the cutting surface to continually present sharp cutting points to the material being ground. The soft nonabrasive diluents improve the performance of bonded abrasives since they breakdown quickly during the grinding action and leave holes or depressions over the grinding face, which aid the breakdown of the abrasive grains and help maintain a sharp-cutting grinding surface. Coated abrasives, on the other hand, have only a single layer of abrasive grains. Thus, adding soft nonabrasive diluents, which breakdown quickly under grinding action and aid the breakdown of the abrasive grains, to coated abrasives, would be expected to lead to the removal of the entire cutting surface, thereby reducing the life and performance of the abrasive article.

BRIEF DESCRIPTION OF THE INVENTION

The present invention provides coated abrasive articles having excellent abrading effectiveness, utilizing the advantages inherent in premium abrasive grains, while minimizing the quantity of such grains actually employed. Indeed, in some instances synergistic effects are obtained, the construction actually performing better than coated abrasive products in which only the premium abrasive is present.

The present invention provides a coated abrasive article comprising a blend of premium abrasive grains and nonabrasive inorganic diluent grains adhered to a backing material. As used herein inorganic diluent grains include both individual grains of inorganic diluent and multigrain aggregates of inorganic diluent bound together by means such as fusing, or binders. Binders used to form these multigrain aggregates can be either organic or inorganic.

The nonabrasive inorganic diluent grains have a Knoop hardness less than 200. Useful examples of such nonabrasive diluents include marble, marl, travertine, chalk, coral, coquina, oolite, and gypsum, with marble and gypsum being preferred. The premium abrasive grains useful in the present invention include alpha alumina-based ceramic materials, fused alumina-zirconia, refractory coated silicon carbide, diamond, cubic boron nitride, and combinations thereof. The preferred premium abrasive grains are fused alumina-zirconia and alpha alumina-based ceramics.

The incorporation of the nonabrasive inorganic diluent grains into the coated abrasive article of the present invention endows the abrasive article with an unexpected abrading efficiency when compared to a similar coated abrasive containing a full loading of premium abrasive grains. Coated abrasive articles of the present invention have abrading efficiencies equal to, or superio to, the abrading efficiencies of undiluted coated abrasive articles containing a full loading of premium abrasive grains, despite the drastically reduced proportion of abrasive grains in the coated abrasive article of the present invention. Additionally, since the nonabrasive diluent grains are generally less expensive than the premium abrasive grains, the coated abrasive articles of the present invention are less expensive than coated abrasive articles containing a full loading of premium abrasive grains with no diluent.

DETAILED DESCRIPTION

The coated abrasive products of the present invention generally include conventional backings and binders and a premium abrasive material which is diluted with a nonabrasive inorganic diluent. Materials used in abrasive articles are often categorized according to their ability to abrade a surface. Materials capable of quickly abrading a surface being denoted "premium" while those that abrade a surface slowly, or not at all, are denoted "nonabrasive". The designation as premium or nonabrasive involves a considerable degree of subjectivity, and depends to some degree on the type of workpiece and the abrading conditions employed. Nevertheless, for most commercially significant abrading operations, it has been found that a test involving the abrasion of cold rolled steel with coated abrasive products having only one type of grain, will, when compared to an identical construction involving a different grain, yield test results which are highly reliable in categorizing abrasives as premium or nonabrasive.

To classify materials commonly used in abrasive articles as premium or nonabrasive, abrasive discs containing Grade 36 abrasive grains (average grain size of 710 micrometers) were prepared. Conventional coated abrasive making procedures were followed using conventional 0.76 mm thick vulcanized fiber backings, a conventional calcium carbonate-filled phenolic resin make coat, and a conventional cryolite-filled phenolic resin size coat. The make coat weight was 170 g/m². The make resin was precured for 90 minutes at 88° C. and the size resin precured for 90 minutes at 88° C. followed by final curing at 100° C. for 10 hours. The coatings were applied via conventional techniques in a one-trip operation and were cured in a forced air oven. The cured 17.8 cm diameter discs were conventionally flexed to controllably break the hard bonding resins, mounted on a beveled aluminum back-up pad, and used to grind a 1.25 cm by 18 cm face of a 1018 cold rolled steel workpiece. The disc was driven at 5,500 rpm while the portion of the disc overlying the beveled edge of the back-up pad contacted the workpiece at a load of 5.91 kg. Grinding was conducted for one minute time intervals and each disc was used to grind a separate workpiece for a total of 12 minutes or until no more than 5 grams of metal were removed in any one minute grinding cut, whichever came first. This test was performed for different discs, each disc containing undiluted grains of one of the following materials: fused alumina-zirconia, ceramic aluminum oxide, heat-treated fused aluminum oxide, brown fused aluminum oxide, garnet, and marble. The total amount of metal (total cut) removed by using such discs can be found in Table 1, along with the mineral and size coating weights. In each case, the total cut figure is the average for at least three discs.

TABLE 1

| Grain Designation | Coating Weight | | Total Cut (g) |
|---|---|---|---|
| | Grain (g/m²) | Size (g/m²) | |
| Fused alumina-zirconia | 920 | 700 | 969 |
| Ceramic aluminum oxide | 1060 | 700 | 1411 |
| Heat treated aluminum oxide | 900 | 530 | 329 |
| Brown fused aluminum oxide | 1060 | 700 | 371 |
| Garnet | 1270 | 700 | 209 |

TABLE 1-continued

| Grain Designation | Coating Weight | | Total Cut (g) |
|---|---|---|---|
| | Grain (g/m²) | Size (g/m²) | |
| Marble | 530 | 540 | 22 |

If the total cut of a coated abrasive disc is greater than 500 grams, the abrasive grain is considered premium. If the total cut of a coated abrasive disc is less than 50 grams, the grain is considered nonabrasive. Typically, nonabrasive diluent grains will cut considerably less than 50 grams. The stock removal of 1018 steel by non-abrasive diluent grains is not attributed to its cutting power but solely to the mechanical friction of the workpiece rubbing against the nonabrasive diluent grains.

The nonabrasive diluent grains defined above should not be confused with the abrasive grains denoted "inferior" in U.S. Pat. No. 4,734,104 and U.S. Pat. No. 4,737,163. The designation as "superior" or "inferior" abrasive in these two references is a relative measurement between two different abrasive grain types. If a coated abrasive product containing one type of abrasive grain cuts over 10% more than an identical coated abrasive product containing a different type of abrasive grain, under identical test conditions, then the first type of abrasive grain is deemed "superior" and the second type "inferior". Thus, the designation as "superior" or "inferior" is a characteristic of the pair of abrasive grain types compared, not a measurement of the ultimate abrasiveness of the abrasive grain type so designated. The abrasive grain types denoted "inferior" are abrasive nonetheless and differ, therefore, from the nonabrasive diluent grains defined above.

Premium abrasive grains useful in the present invention include alpha alumina-based ceramic materials such as those disclosed in U.S. Pat. Nos. 4,314,827, 4,518,397, 4,574,003, 4,623,364, 4,744,802 and EP publication 228,856; fused alumina-zirconia such as disclosed in U.S. Pat. Nos. 3,781,172, 3,891,408 and 3,893,826; refractory coated silicon carbide such as disclosed in U.S. Pat. No. 4,505,720; diamond; cubic boron nitride and combinations thereof.

The nonabrasive inorganic diluent grains used in the present invention have a hardness less than 200 on the Knoop hardness scale. Typical nonabrasive diluent grains of the invention include limestone and gypsum. Limestone encompasses a whole family of materials whose chemical composition is primarily calcium carbonate. Limestone type materials useful in the present invention range from lithographic limestone, which is a very fine, even grain variety, to an oolite limestone, which is a coarse rock composed of tiny spherical bodies. Useful materials falling within the limestone family include marble, marl, travertine, chalk, coral, coquina and oolite. The limestone type material preferred in the practice of this invention is marble (typically consisting of about 99% calcium carbonate).

Gypsum, calcium sulfate dehydrate, $CaSO_4 \cdot 2H_2O$, is another nonabrasive diluent grain useful in the present invention. It is known for its softness, having MOH's hardness between 1.5 and 2.0. Gypsum is available as a natural mineral or as a synthetic by-product of chemical processes such as phosphoric acid synthesis, titanium oxide synthesis, citric acid synthesis and stack gas scrubbing. The natural mineral is rarely found in pure form and typically contains calcium carbonate, magnesium carbonate, silica, clay minerals and a variety of soluble salts.

The nonabrasive inorganic diluent grains of the invention should not be confused with organic diluents or inorganic fillers which are sometimes used in the bond system of coated abrasives. The nonabrasive inorganic diluent grain is significantly larger than inorganic fillers and is a part of the grain layer, not a part of the bond system.

Typically, very soft materials do not function as abrasive grains. Thus, the discovery that coated abrasives containing blends of premium abrasive grains with soft nonabrasive diluent grains exhibit abrading characteristics equal to, or superior to, coated abrasives containing only premium abrasive grains, or blends of premium abrasive grains with other abrasive grains, is unexpected. Even more unexpected, however, is the discovery of the amount by which the premium abrasive grains can be diluted without a reduction in abrading characteristics. It has been found that a ratio as high as 95 parts of nonabrasive diluent grains to 5 parts premium abrasive grains by volume produces a coated abrasive that performs equal to, or superior to, one containing 100% premium abrasive grains. This result is unexpected since only a minor portion of the total amount of grains, i.e., the premium grains, is actually abrading the workpiece. The preferred range of diluent grains is from about 50% to about 80% by volume based on a total volume of 100% of all grain. However, coated abrasives containing less than 50% by volume nonabrasive diluent grains still have performance characteristics equal to, or superior to, ones containing 100% premium abrasive grains.

The nonabrasive inorganic diluent grains are generally less expensive than conventional abrasives such as fused aluminum oxide and silicon carbide, and significantly less expensive than premium grains such as fused alumina-zirconia and alpha alumina-based ceramic materials. Thus, the coated abrasives of the present invention are less expensive than coated abrasives made with 100% premium abrasive grain. In some cases the cost of a coated abrasive article of the present invention is equal to, or less than, the cost of a coated abrasive article made of conventional abrasive grains, while having an abrading efficiency equal to, or superior to, a coated abrasive article made of premium abrasive grains. The actual costs are difficult to predict, however, due to changing market conditions.

The process for making the coated abrasive product of the invention is essentially the same as what is currently known in the art. The make adhesive coat is applied to the backing, followed by the addition of the grains. The premium abrasive grains and the nonabrasive diluent grains can either be blended together and coated as a single layer or coated in separate layers. In the blending method, the two grains are charged to a mixer and blended; then the grains are electrostatically coated. In the second method, the nonabrasive diluent grains are drop coated onto the make adhesive coat and the premium abrasive grains are electrostatically coated on top of the diluent grains. After the addition of the grains, the make coat is solidified enough to secure the grains to the backing in order for the size adhesive coat to be applied. After sizing, the adhesive is solidified and an optional supersize adhesive, which may contain a grinding aid, can be applied.

Grinding aids, or active fillers, may also be added to the size coat or as a particulate material. The preferred grinding aid is potassium fluoroborate, although other grinding aids such as sodium chloride, sulfur, potassium titanium fluoride, polyvinyl chloride, polyvinylidene chloride, cryolite, and combinations thereof, are also believed to be useful. The preferred amount of grinding aid is on the order of 50 to 300, preferably 80 to 160, grams per square meter of coated abrasive product.

The preferred coated abrasive construction comprises a polyester cloth backing, a calcium carbonate-filled resole phenolic resin as the make coat, fused alumina-zirconia or alpha alumina-based ceramic materials as the premium abrasive grains, gypsum as the nonabrasive diluent grain, a cryolite-filled resole phenolic resin as the size coat and a potassium fluoroborate-filled epoxy resin as a supersize coat. The preferred volume ratio of premium abrasive grains to nonabrasive diluent grains ranges from 90:10 to 5:95, and more preferably from 50:50 to 20:80.

The invention is further illustrated by the following nonlimiting examples wherein all parts and percentages are by volume unless otherwise stated.

EXAMPLES

The following examples describe the various components and steps that were used to fabricate the invention. The coating weights of the make coat, the abrasive grains, the size coat, and the supersize coat are all in grams per square meter unless otherwise specified.

YW: WOVEN Y WEIGHT POLYESTER BACKING. The coated abrasive backing used was a Y weight woven polyester cloth with a four over one weave. The backing was saturated with a latex/phenolic resin and then placed in an oven to partially cure the resin. Next, a calcium carbonate-filled latex/phenolic resin coating was applied to the backside of the backing and the coated backing was heated to 120° C. and maintained at this temperature until the resin had cured to a tack-free state. Finally, a coating of latex/phenolic resin was applied to the coat (or front) side of the coated backing and the coated backing was heated to 120° C. and maintained at this temperature until the resin had cured to a tack-free state. The backing was now completely treated and was ready to receive the make coat.

XW: WOVEN X WEIGHT POLYESTER BACKING. The coated abrasive backing used was an X weight woven polyester cloth with a four over one weave. The backing was prepared in the same manner as described above for the Y weight woven polyester backing. After the backing was completely treated, it was ready to receive the make coat.

YS: STITCHBONDED POLYESTER BACKING. The coated abrasive backing used was a Y weight knitted polyester cloth. The treating system for the backing was the same as described above for the woven polyester backing.

MAKE COAT: The make coat was a calcium carbonate-filled resole phenolic resin which was diluted with solvent to 84% solids. The make coat was applied on top of the coated backing to provide an average weight of 280, unless otherwise specified.

After the make coat was applied, the grains were applied as described below. The grains were grade 50 (average particle size of 430 micrometers) according to ANSI standards.

BLEND: BLEND OF GRAINS. In this method, the premium abrasive grains were blended with the diluent grains in a specified volume ratio. Then the blend was electrostatically coated.

LAYERS: GRAINS IN SEPARATE LAYERS. In this method, the nonabrasive grains were drop coated on to the make coat, then the premium abrasive grains were electrostatically coated.

Immediately after the grains were applied, the substrate/grain composite was precured for 90 minutes in an oven set at 88° C. Next, a size coat was applied which is detailed below.

CCSC: CALCIUM CARBONATE SIZE COAT. This size coat was a calcium carbonate-filled resole phenolic resin diluted with solvent to 78% solids. The average size coat weight was 285, unless otherwise specified.

CRSC: CRYOLITE SIZE COAT. This size coat was a cryolite-filled resole phenolic resin diluted with solvent to a 76% solids. The average size coat weight was 285, unless otherwise specified.

KBFSC: POTASSIUM FLUOROBORATE SIZE COAT. This size coat was potassium fluoroborate-filled epoxy/amine curvative resin diluted with solvent to 72% solids. The average size coat weight was 155, unless otherwise specified.

After size coating, the coated abrasive material received a precure of 90 minutes at 88° C. and then a final cure of 10 hours at 100° C. The coated abrasive material was then flexed.

SUPERSIZE COAT. The supersize coat is an optional coat that is applied over the size coat. It comprised potassium fluoroborate as a grinding aid in an epoxy/amine curvative resin. The average supersize coat weight was 155. It was cured in an oven at 88° C. for 90 minutes.

The coated abrasive material was then converted into endless belts which were tested for abrasiveness, as described in the following test procedure. A preweighed, stainless steel workpiece (SAE 304) approximately 2.5×5×18 cm, mounted in a holder, was positioned vertically, with the 2.5×18- cm face confronting an approximately 36-cm diameter 85 Shore A durometer serrated rubber contact wheel with one on one lands over which was entrained a belt to be tested. The workpiece was then reciprocated vertically through an 18 cm path at the rate of 20 cycles per minute, while a spring-loaded plunger urged the workpiece against the belt with a load of 13.6 kg, as the belt was driven at about 2050 meters per minute. After one minute of elapsed grinding time, the workpiece-holder assembly was removed and reweighed, the amount of stock removed calculated by subtracting the abraded weight from the original weight, and a new, pre-weighed workpiece and holder was mounted on the equipment.

EXAMPLES 1 THROUGH 3

Examples 1 through 3 compare coated abrasives having decreasing ratios of aluminum oxide to marble. The aluminum oxide was heat treated and is not considered to be a premium abrasive grain. The marble, which is the same marble used in the rest of the examples, was purchased under the trade designation Carthage Marble from JM Huber Corp. The backing was XW, the grains were blended together, and the size coat was KBFSC with an average weight of 270. The cut data is reported in Table 2; with the total cut being the amount of material removed in 20 minutes of grinding.

TABLE 2

Comparison of different ratios of a nonpremium abrasive grain to a nonabrasive diluent grain.

| Example | Volume Ratio Aluminum Oxide/Marble | Grain Weight | Total Cut (grams) |
|---|---|---|---|
| 1 | 75/25 | 653 | 697 |
| 2 | 50/50 | 590 | 639 |
| 3 | 25/75 | 555 | 530 |

It can be seen from the above data that as the amount of nonabrasive diluent grain was increased from 25 volume percent to 75, and the amount of the nonpremium abrasive grain decreased, the performance decreased.

EXAMPLES 4 and 5

Examples 4 and 5 compare the abrasive performance of a coated abrasive containing 100% aluminum oxide abrasive grain to one containing a blend of aluminum oxide abrasive grains with marble diluent grains. The aluminum oxide was fused brown aluminum oxide and is not considered to be a premium abrasive grain. The backing was YW, the grains were blended together and the size coat was KBFSC. The make coat weight was 245, grain weigth was 612 and the size coat weight was 294. The cut data corresponding to 20 minutes of grinding is reported in Table 3.

TABLE 3

Comparison of different ratios of a nonpremium abrasive grain to a nonabrasive diluent grain.

| Example | Volume Ratio Aluminum Oxide/Marble | Cut (grams) |
|---|---|---|
| 4 | 100/0 | 854 |
| 5 | 75/25 | 855 |

These examples demonstrate essentially the same performance, despite the removal of 25% of the abrasive grain and its replacement with the nonabrasive marble diluent.

EXAMPLES 6 THROUGH 9

Examples 6 through 9 compare coated abrasives of the invention having decreasing ratios of ceramic based aluminum oxide containing yttrium oxide premium abrasive grain to a marble nonabrasive diluent grain. The premium abrasive grain was made according to European patent application EP No. 228,856, published Jul. 15, 1987. The backing was XW, the grains were blended together and the size coat was KBFSC. The grinding was terminated when the final cut was approximately less than 60 grams per minute. The coating weights and test data are reported in Tables 4 and 5, respectively.

TABLE 4

| Example | Coating Weights | | |
|---|---|---|---|
| | Make | Grain | Size |
| 6 | 226 | 624 | 297 |
| 7 | 247 | 561 | 306 |
| 8 | 243 | 566 | 281 |
| 9 | 230 | 520 | 306 |

TABLE 5

Comparison of different ratios of a premium abrasive grain to a nonabrasive diluent grain.

| Example | Volume Ratio Premium Grains/Diluent Grains | Cut (grams) |
| --- | --- | --- |
| 6 (control) | 100/0 | 1295 |
| 7 | 75/25 | 1442 |
| 8 | 50/50 | 1542 |
| 9 | 25/75 | 1629 |

It can be seen from the above data that the abrasive performance increased as the amount of premium abrasive grains replaced by nonabrasive diluent grains increased.

EXAMPLES 10 THROUGH 15

Examples 10 through 15 compare coated abrasives having decreasing ratios of fused alumina-zirconia premium abrasive grain to gypsum nonabrasive diluent grain. The gypsum was industrial gypsum purchased from U.S. Gypsum and is the same gypsum used in the remainder of the examples. The backing was YS, the grains were blended together, and the size coat was CRSC. The make coat weight was 335 and the size coat weight was 286. Grinding was terminated when the final cut was less than 35 grams in sixty seconds. The cut data is reported in Table 6.

TABLE 6

Comparison between different ratios of alumina zirconia and gypsum.

| Example | Volume Ratio Alumina-Zirconia/Gypsum | Grain Weight | Total Cut (grams) |
| --- | --- | --- | --- |
| 10 | 100/0 | 712 | 495 |
| 11 | 80/20 | 630 | 668 |
| 12 | 60/40 | 608 | 756 |
| 13 | 40/60 | 553 | 907 |
| 14 | 20/80 | 420 | 1034 |
| 15 | 5/95 | 331 | 771 |

In this set of examples the optimum nonabrasive diluent loading is approximately 80% by volume. It is surprising and unexpected that a coated abrasive having only 20% premium abrasive grain cut over twice as much as a coated abrasive having 100% premium abrasive grain.

EXAMPLES 16 AND 17

Examples 16 and 17 compare the abrasive performance of grade 50 coated abrasives containing a blend of premium abrasive grains and nonabrasive diluent grains, the abrasive and diluent grains being mixed together and applied as a single layer in one, versus the grains being applied as separate layers in the other. The volume ratio of the fused alumina-zirconia premium abrasive grain to the marble nonabrasive diluent grain was 60:40. The backing was YW, the size coat was CRSC and a supersize coat was applied. The grinding test was terminated when the final cut was less than 40 grams in sixty seconds. The coating weights and grinding data are reported in Table 7.

TABLE 7

Grains Blended vs. Grains in Separate Layers.

| Example | Make | Grain | Size | Supersize | Total Cut (grams) |
| --- | --- | --- | --- | --- | --- |
| 16 blend | 210 | 557 | 356 | 134 | 2330 |
| 17 layers | 281 | 637 | 289 | 159 | 2617 |

A performance increase of 12% is shown when the premium abrasive grains and nonabrasive diluent grains are applied in separate layers rather than being blended together and applied as a single layer.

EXAMPLES 18 AND 19

These examples compare the coated abrasive performance using marble, versus gypsum, as the nonabrasive diluent in combination with fused alumina-zirconia as the premium abrasive grain. Examples 18 and 19 were fabricated and tested in the same manner as Example 17. Example 18 contained marble as the nonabrasive diluent grain and Example 19 contained gypsum as the nonabrasive diluent grain. The coating weights and cut results are reported in Table 8.

TABLE 8

Comparison of Marble vs. Gypsum as the Nonabrasive Diluent Grain

| Example | Make | Grain | Size | Supersize | Total Cut (grams) |
| --- | --- | --- | --- | --- | --- |
| 18 marble | 210 | 557 | 356 | 123 | 2330 |
| 19 gypsum | 189 | 507 | 306 | 96 | 2605 |

A performance increase of 12% is shown when gypsum is the nonabrasive diluent grain rather than marble.

EXAMPLES 20 THROUGH 25

Examples 20 through 25 compare the abrasive performance of coated abrasives made using a blend of fused alumina-zirconia as the premium abrasive grains with several diluent grains of various hardnesses. The backing was YW and the size coat was CCSC. The blend of grains comprised 80% by volume diluent grains and 20% by volume fused alumina-zirconia. The coating weights, nonabrasive diluents, and the cut data are reported in Table 9. The grinding test was terminated when the stock removed in 60 seconds was less than 30 grams. A control having no diluent grains is provided for comparison.

TABLE 9

Comparison of Different Diluents.

| Example | Diluent | Make | Grain | Size | Total Cut (grams) |
| --- | --- | --- | --- | --- | --- |
| 20 | Control | 201 | 708 | 335 | 665 |
| 21 | Gypsum | 205 | 532 | 285 | 671 |
| 22 | Pumice | 201 | 708 | 218 | 279 |
| 23 | Garnet | 189 | 440 | 253 | 463 |
| 24 | Emery | 195 | 520 | 226 | 478 |
| 25 | Brown $Al_2O_3$ | 205 | 532 | 243 | 452 |

It can be seen from this data that gypsum was the best diluent grain tested.

What is claimed is:

1. A coated abrasive article comprising a backing member having adherently bonded thereto by a bonding material a volume of particles as a layer, said particles consisting essentially of (a blend) of premium and having a Knoop hardness less than 200, said coated abrasive article having at least the same abrasive performance as the same abrasive article with all of said volume of particles consisting only of particles of said premium abrasive grains.

2. A coated abrasive article as in claim 1 wherein said backing member is selected from the group consisting of paper, polymeric film, cloth, vulcanized fiber, nonwoven web, and combinations thereof.

3. A coated abrasive article as in claim 2 wherein said bonding material is selected from the group consisting of hide glue, phenolic resin, epoxy resin, acrylate resin, melamine resin, urethane resin, urea-formaldehyde resin and combinations thereof.

4. A coated abrasive article as in claim 2 wherein said premium abrasive grain is selected from the group consisting of alpha alumina-based ceramic materials, fused alumina-zirconia, refractory coated silicon carbide, diamond, cubic boron nitride, and combinations thereof.

5. A coated abrasive article as in claim 2 wherein said diluent grain is comprised of "marble."

6. A coated abrasive article as in claim 2 wherein said diluent grain is comprised of "gypsum".

7. A coated abrasive article as in claim 2 wherein said nonabrasive diluent grains comprise 10 to 95 percent of said volume of said particles.

8. A coated abrasive article as in claim 2 wherein said nonabrasive diluent grains comprise 50 to 80 percent of said volume of said particles.

9. A coated abrasive article as in claim 2 wherein said bonding material comprises a make coating of adhesive on one major surface of said backing member and an adhesive size coating overlying said make coating and said particle layer.

10. A coated abrasive article as in claim 1 wherein said size coating contains a grinding aid.

11. A coated abrasive article as in claim 10 wherein said size coating contains a grinding aid selected from the group consisting of potassium fluoroborate, cryolite, sodium chloride, sulfur, potassium titanium fluoride, polyvinyl chloride, polyvinylidene chloride, and mixtures thereof.

12. A coated abrasive article as in claim 10 wherein said bonding material further comprises "an adhesive supersize coating" overlying said size coating.

13. A coated abrasive article as in claim 12 wherein said supersize coating contains a grinding aid.

14. A coated abrasive article as in claim 13 wherein said supersize coating contains a grinding aid selected from the group consisting of potassium fluoroborate, cryolite, sodium chloride, sulfur, potassium titanium fluoride, polyvinyl chloride, polyvinylidene chloride, and mixtures thereof.

15. A coated abrasive article comprising:
(a) a backing material;
(b) a of calcium carbonate-filled resole phenolic resin on one major surface of said backing material;
(c) a of essentially the same grade comprising a blend of 20 to 50% by volume fused alumina-zirconia premium abrasive grains and 80 to 50% by volume gypsum nonabrasive diluent grains adhered to said backing material by said make coating;
(d) a of resole phenolic resin containing cryolite grinding aid overlying said layer of particles; and
(e) a of epoxy resin containing potassium fluoroborate grinding aid overlying said size coating; said coated abrasive article having at least the same abrasive performance as the same abrasive article with said volume of particles consisting only of fused alumina-zirconia premium abrasive grains.

16. A coated abrasive article comprising:
(a) a polyester cloth backing material;
(b) a make coating of calcium carbonate-filled resole phenolic resin on one major surface of said backing material;
(c) a layer of a volume of particles of essentially the same grade comprising a blend of 20 to 50% by volume alpha alumina-based premium abrasive grains and 80 to 50% by volume gypsum nonabrasive diluent grains adhered to said backing material, by said make coating;
(d) a size coating of resole phenolic resin containing cryolite grinding aid overlying said layer of particles; and
(e) a supersize coating of epoxy resin containing potassium fluoroborate grinding aid overlying said size coating; said coated abrasive article having at least the same abrasive performance as the same abrasive article with said volume of particles consisting only of alpha alumina-based premium abrasive grains.

17. A coated abrasive article as in claim 2 wherein said premium abrasive grains and said nonabrasive diluent grains are of the same grade.

18. A method of making the coated abrasive article of claim 2 comprising the steps of:
(a) of a backing material with a layer of uncured adhesive;
(b) over said layer of uncured adhesive, said particle layer comprising a blend of premium abrasive grains and nonabrasive inorganic diluent grains having a Knoop hardness less than 200;
(c) said layer of uncured adhesive;
(d) over said layer of particles; and
(e) said layers of adhesive.

19. A method as in claim 18 wherein said layer of particles is applied by electrostatically coating an admixture of the premium abrasive grains and the nonabrasive diluent grains.

20. A method as in claim 18 wherein said layer of particles is applied by first drop coating the nonabrasive diluent grains followed by electrostatically coating the premium abrasive grains.

* * * * *

UNITED STATES PATENT AND TRADEMARK OFFICE
CERTIFICATE OF CORRECTION

PATENT NO. : 5,011,512

DATED : April 30, 1991

INVENTOR(S) : WALD, ET AL.

It is certified that error appears in the above-identified patent and that said Letters Patent is hereby corrected as shown below:

Col. 4, line 62, "superio" should read --superior--.

Col. 12, line 59, after "premium" insert --abrasive grains and nonabrasive inorganic diluent grains--; delete "and".

Col. 13, line 1, "claim 2" should read --claim 1--.

Col. 13, line 6, "claim 2" should read --claim 1--.

Col. 13, line 12, "claim 2" should read --claim 1--.

Col. 13, line 15, "claim 2" should read --claim 1--.

Col. 13, line 17, "claim 2" should read --claim 1--.

Col. 13, line 20, "claim 2" should read --claim 1--.

Col. 13, line 23, "claim 2" should read --claim 1--.

Col. 13, line 28, "claim 1" should read --claim 9--.

Col. 13, line 30, "claim 10" should read --claim 9--.

Col. 13, line 36, "claim 10" should read --claim 9--.

UNITED STATES PATENT AND TRADEMARK OFFICE
CERTIFICATE OF CORRECTION

PATENT NO. : 5,011,512

DATED : April 30, 1991

INVENTOR(S) : WALD, ET AL.

It is certified that error appears in the above-identified patent and that said Letters Patent is hereby corrected as shown below:

Col. 13, line 42, "claim 13" should read --claim 12--.

Col. 13, line 50, after "(b) a" insert --make coating--.

Col. 13, line 52, after "(c) a" insert --layer of a volume of particles--.

Col. 14, line 3, after "(d) a" insert --size coating--.

Col. 14, line 5, after "(e) a" insert --supersize coating--.

Col. 14, line 37, after "(a)" insert --coating one major surface--

Col. 14, line 39, after "(b)" insert --applying a layer of particles--.

Col. 14, line 43, after "(c)" insert --partially curing--.

Col. 14, line 44, after "(d)" insert --applying a layer of uncured adhesive--

UNITED STATES PATENT AND TRADEMARK OFFICE
CERTIFICATE OF CORRECTION

PATENT NO. : 5,011,512

DATED : April 30, 1991

INVENTOR(S) : WALD, ET AL.

It is certified that error appears in the above-identified patent and that said Letters Patent is hereby corrected as shown below:

Col. 14, line 45, after "(e)" insert --completely curing--.

Signed and Sealed this

Sixth Day of April, 1993

Attest:

STEPHEN G. KUNIN

Attesting Officer

Acting Commissioner of Patents and Trademarks